United States Patent
Bellay (10) Patent No.: US 11,821,659 B2
(45) Date of Patent: Nov. 21, 2023

(54) ACTIVE ROOF PANELS AND THERMAL COLLECTORS

(71) Applicant: Péter Bellay, Budapest (HU)

(72) Inventor: Péter Bellay, Budapest (HU)

( * ) Notice: Subject to any disclaimer, the term of this patent is extended or adjusted under 35 U.S.C. 154(b) by 267 days.

(21) Appl. No.: 17/001,606

(22) Filed: Aug. 24, 2020

(65) Prior Publication Data

US 2021/0071913 A1   Mar. 11, 2021

Related U.S. Application Data

(63) Continuation-in-part of application No. 15/759,189, filed as application No. PCT/HU2017/000027 on Apr. 20, 2017, now Pat. No. 10,753,649.

(30) Foreign Application Priority Data

Apr. 20, 2016   (HU) .................................. P1600265

(51) Int. Cl.
| | |
|---|---|
| *F24S 20/67* | (2018.01) |
| *F24S 10/30* | (2018.01) |
| *F24S 10/70* | (2018.01) |
| *E04D 3/35* | (2006.01) |
| *E04C 2/292* | (2006.01) |
| *E04C 2/52* | (2006.01) |
| *F24S 80/60* | (2018.01) |

(52) U.S. Cl.
CPC .............. *F24S 20/67* (2018.05); *E04C 2/292* (2013.01); *E04C 2/525* (2013.01); *E04D 3/357* (2013.01); *F24S 10/30* (2018.05); *F24S 10/72* (2018.05); *F24S 80/60* (2018.05)

(58) Field of Classification Search
USPC ......................................................... 126/621
See application file for complete search history.

(56) References Cited

U.S. PATENT DOCUMENTS

| | | | |
|---|---|---|---|
| 4,135,490 A | 1/1979 | Soleau, Jr. | |
| 4,237,866 A | 12/1980 | Rush | |
| 4,284,066 A * | 8/1981 | Brow ...................... | F24S 10/25 126/643 |

(Continued)

FOREIGN PATENT DOCUMENTS

EA          201170630 A        10/2011

*Primary Examiner* — Steven B McAllister
*Assistant Examiner* — John E Bargero
(74) *Attorney, Agent, or Firm* — Morgan, Lewis & Bockius LLP (57) ABSTRACT

A heat collector device is provided. The heat collector includes an exterior surface exposed to an environment, and an interior surface. Side walls separate the exterior and interior surfaces. A heat insulation interposes the exterior and interior surfaces. Each hot air duct includes a first portion interfacing with the external surface and a second portion interfacing with the heat insulation. Each cold air duct is encompassed by the heat insulation. A first chamber formed by a first side wall provides fluidic communication between the air ducts at a first end portion of each respective duct. A second chamber formed by a second side wall provides fluidic communication between the air ducts at a second end portion of each respective duct. A heat exchange mechanism disposed in the second chamber removes heat from a first fluidic medium of the air ducts, the first chamber, and the second chamber.

19 Claims, 9 Drawing Sheets

(56) References Cited

U.S. PATENT DOCUMENTS

| | | |
|---|---|---|
| 4,437,789 A | 3/1984 | Merrigan |
| 8,753,732 B2 | 6/2014 | Jorgensen |
| 2005/0081908 A1 | 4/2005 | Stewart |
| 2011/0030287 A1* | 2/2011 | Moore .................... E04D 13/17 52/302.1 |
| 2011/0297297 A1* | 12/2011 | Carolan .............. F24F 13/0245 156/78 |
| 2017/0237387 A1* | 8/2017 | Hudson .................. H02S 20/23 52/173.3 |
| 2019/0055731 A1 | 2/2019 | Nasibov |

\* cited by examiner

ACTIVE ROOF PANELS AND THERMAL COLLECTORS

CROSS REFERENCE TO RELATED APPLICATION

The present Application is a continuation-in-part of U.S. patent application Ser. No. 15/759,189, filed Mar. 9, 2018, entitled "Roof Panels to Serve as Thermal Collectors," which is a National Stage of International Patent Application No.: PCT/HU2017/000027, filed Apr. 20, 2017, entitled "Sandwich Roof Panels to Serve as Thermal Collectors," which claims priority to Hungarian Patent Application No.: P1600265 filed Apr. 20, 2016, each of which is hereby incorporated by reference in its entirety.

TECHNICAL FIELD

The present disclosure generally relates to roof panels. More particularly, the present disclosure relates to active roof panels and thermal collectors.

BACKGROUND

Conventional roof panels lack a capacity to exchange heat and energy with an environment without requiring significant modification to a structure of the roof panels. Moreover, conventional roof panels require one or more layers of insulation above an absorber plate, reducing an efficiency of exchange with the environment. This one or more layers of insulation is often glass, meaning that the absorber plate lacks profiling required to provide an optimal exchange of energy with the environment. Furthermore, conventional roof panels lack a mechanism to control various features of the roof panel in response to instructions or environmental features.

Given the above background there is a need in the art for improved active roof panels and thermal collectors to address this dilemma.

The information disclosed in this background section is only for enhancement of understanding of the general background of the invention and should not be taken as an acknowledgement or any form of suggestion that this information forms the prior art already known to a person skilled in the art.

SUMMARY

Advantageously, the systems and methods detailed in the present disclosure address the shortcomings in the prior art detailed above.

One aspect of the present disclosure is directed to providing a heat collector device. The heat collector includes an exterior surface exposed to an environment. The external surface includes a metal material. An interior surface opposes the external surface. A plurality of side walls separates the exterior surface and the interior surface. A heat insulation interposes between the exterior surface and the interior surface. The heat collector device comprises a plurality of hot air ducts. Each hot air duct in the plurality of hot air ducts includes a first portion interfacing with the external surface and a second portion interfacing with the heat insulation. Moreover, the heat collector device includes a plurality of cold air ducts. Each cold air duct in the plurality of cold air duct is encompassed by the heat insulation. A first chamber is formed by a first side wall in plurality of side walls. The first chamber provides fluidic communication between the plurality of hot air ducts and the plurality of cold air ducts at a first end portion of each respective air duct in the plurality of hot air ducts and the plurality of cold air ducts. Furthermore, a second chamber is formed by a second side wall in plurality of side walls. The second chamber provides fluidic communication between the plurality of hot air ducts and the plurality of cold air ducts at a second end portion of each respective duct in the plurality of hot air ducts and the plurality of cold air ducts. Additionally, a heat exchange mechanism is disposed in the second chamber. The heat exchange mechanism is configured to remove heat from a first fluidic medium of the plurality of cold air ducts, the plurality of hot air ducts, the first chamber, and the second chamber.

In some embodiments, the first chamber includes an aperture providing fluidic communication between the environment and the heat collector.

In some embodiments, the aperture is disposed at the first end portion of a first cold air duct in the plurality of cold air ducts in the first chamber.

In some embodiments, the heat exchange mechanism is either disposed at the first end portion of a first cold air duct in the plurality of cold air ducts in the first chamber or at the second end portion of the first cold air duct in the second chamber.

In some embodiments, the heat exchange mechanism includes a controller, a pump, and a heat sink. The pump is coupled to the controller, and is configured to control a flow of a second fluidic medium within the heat exchange mechanism. The heat sink interfaces with the first fluidic medium and the second fluidic medium.

In some embodiments, the heat exchange mechanism further includes a sensor coupled to the controller. The sensor is configured to determine an internal temperature gradient of the heat collector device.

In some embodiments, the heat sink is integrally formed with the exterior surface and the interior surface of the heat collector device.

In some embodiments, the exterior surface includes a profiled surface.

In some embodiments, a vertical displacement of the profiled surface is in a range in between 0.5 centimeters and 5 centimeters.

In some embodiments, the exterior surface is electrically grounded to at least one side wall in the plurality of side walls.

In some embodiments, a length from the first side wall to the second side wall is in a range between 5 meters (m) and 20 m.

In some embodiments, the heat collector is a roof a building.

In some embodiments, the heat collector device is supported by a rafter of the building or a purlin of a building.

In some embodiments, the heat insulation includes a first layer of heat insulation interfacing with the exterior surface and a second layer of heat insulation interfacing with the interior surface.

In some embodiments, the heat insulation includes an inorganic material.

In some embodiments, the inorganic material comprises silicon oxides, aluminum oxides, hydroxides, or a combination thereof.

In some embodiments, the heat insulation includes a fire retardant material.

In some embodiments, the plurality of side walls includes a third side wall including a first mating mechanism, and a fourth side wall including a second mating mechanism configured to couple with the first mating mechanism.

In some embodiments, the heat collector further includes a spacer interposing between the exterior surface and each hot air duct in the plurality of hot air ducts.

In some embodiments, each side wall in the plurality of side walls comprises a profiled surface.

In accordance with an aspect of the present disclosure, the above and other objects can be accomplished by the provision of an active roof panel, which provides a mechanism to selectively control a heat collector to exchange heat energy.

The methods and apparatuses of the present disclosure have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Thermal collectors require complex constructions, often consuming a significant volume and mass. In this way, active thermal collectors or unsuitable for use as a roof a building since the building must support its structure and the thermal collectors. To address this, the present disclosure provides a thermal collector that transfers energy from an exterior surface (e.g., metal sheet) to one or more hot air ducts without requiring an insulating layer above and/or below the exterior surface. This allows the present disclosure to provide thermal collectors with profiled surfaces that optimize the transfer of energy to provide a more efficient heat collector.

Reference will now be made in detail to various embodiments of the present disclosure, examples of which are illustrated in the accompanying drawing and described below. While the disclosure will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the present invention as defined by the appended claims.

It will also be understood that, although the terms first, second, etc. may be used herein to describe various elements, these elements should not be limited by these terms. These terms are only used to distinguish one element from another. For example, a first air duct could be termed a second air duct, and, similarly, a second air duct could be termed a first air duct, without departing from the scope of the present disclosure. The first air duct and the air duct are both air ducts, but they are not the same air duct.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and or "comprising," when used in this specification, specify the presence of stated features, integers, steps, operations, elements, and or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will be understood that the terms "top," "bottom," "lower," "rear," "upper," and etc. are used to describe features of the exemplary embodiments with reference to the positions of such features as displayed in the figures.

Furthermore, when a reference number is given an "$i^{th}$" denotation, the reference number refers to a generic component, set, or embodiment. For instance, an application termed "application i" refers to the $i^{th}$ application in a plurality of applications.

Additionally, as used herein, the terms "external surface," "exterior surface," and "metal sheet," are used interchangeably unless expressly set forth otherwise.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

Some portions of this detailed description describe the embodiments of the invention in terms of application updates and symbolic representations of operations on information. These application update descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Figure 7:
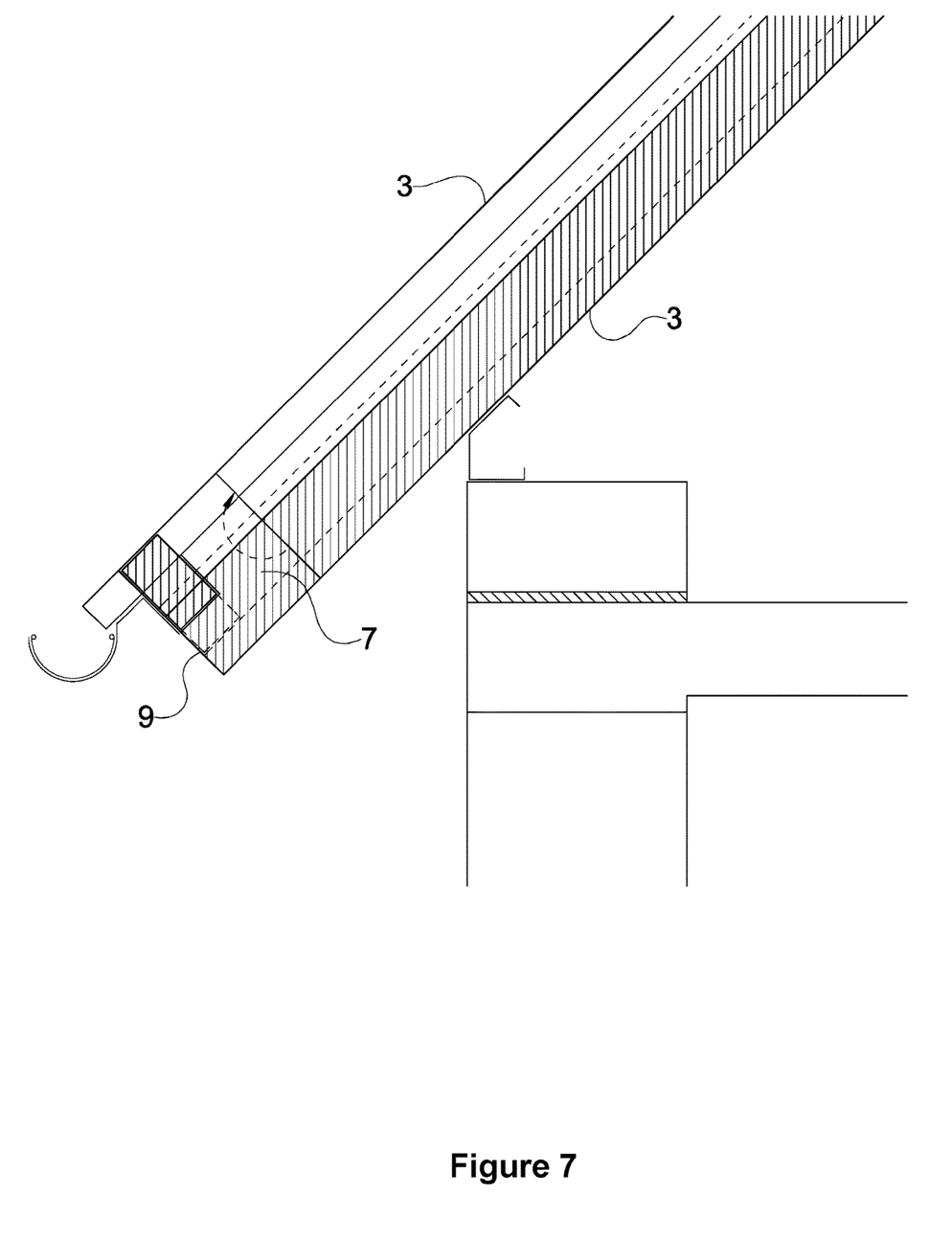
FIG. 7 illustrates a second air reversing chamber of a roof panel, in accordance with an exemplary embodiment of the present disclosure.

Embodiments of the present disclosure are described in the context of roof panels and structures having such roof panels (e.g., roof panel 3 of FIG. 7). The roof panels 3 include a heat collector device that facilitates an exchange of heat and energy with an environment, such as the atmosphere. In some embodiments, the heat collector device is configurable between a first state (e.g., an ON state, a heat collection state, etc.) and a second state (e.g., an OFF state, a heat dissipation state, etc.), allowing the roof panel to have a capability to actively exchange heart with the environment (i.e., an active roof panel).

Figure 2:
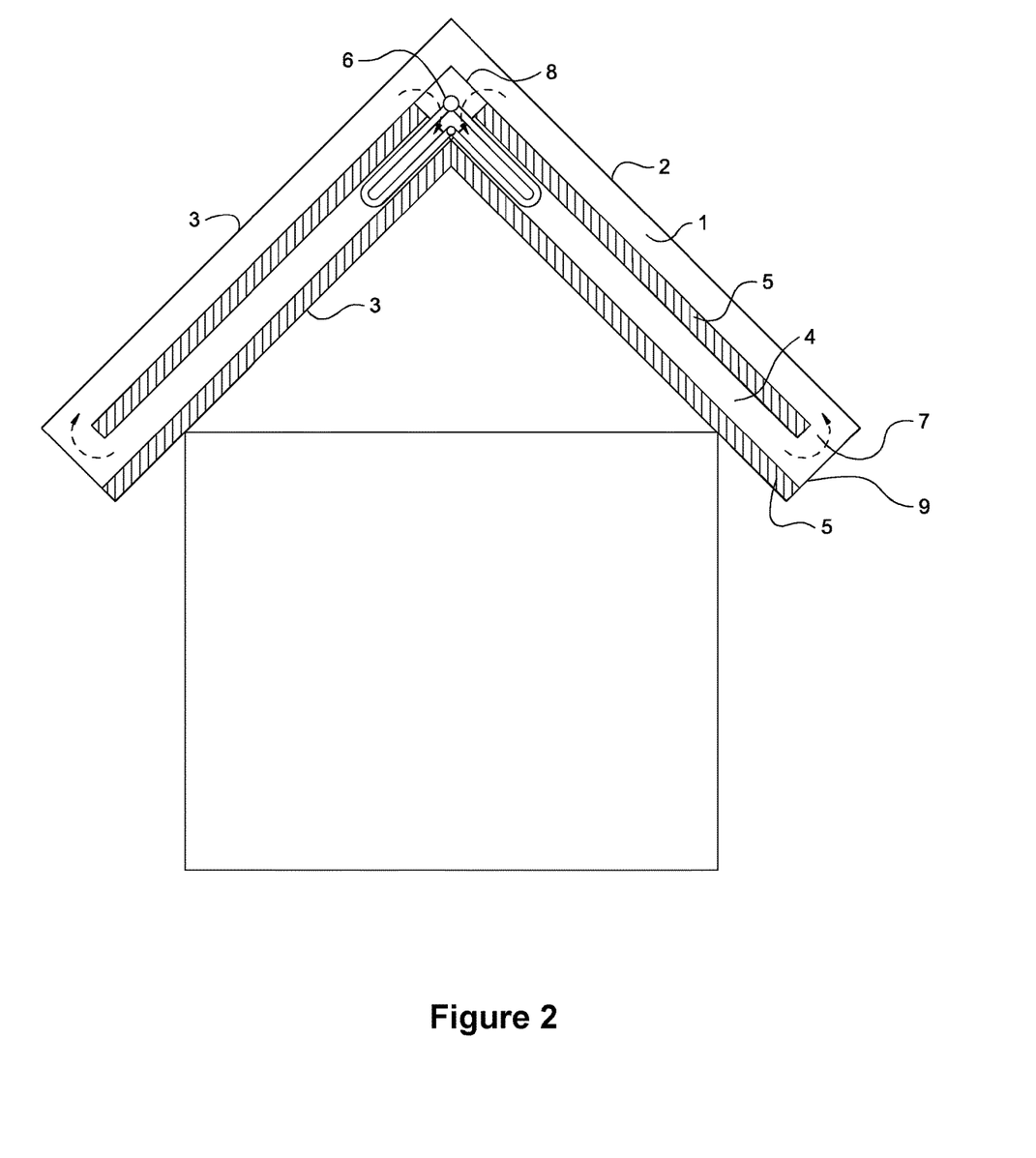
FIG. 2 illustrates a roof panel and a roof, in accordance with an exemplary embodiment of the present disclosure.

In some embodiments, the roof panels 3 is a portion of a roof of a structure, such as an office building of a dwelling. For instance, referring briefly to FIG. 2, in some embodiments, the roof panel 3 is integrally formed with the roof of the structure. In this way, the roof panel 3 provides an optimal transfer of energy by having a direct connection with the structure. Furthermore, the roof panel 3 allows for integration with the structure, without requiring modification to the structure, such as reinforcement of an underlying foundation of the structure.

Figure 3:
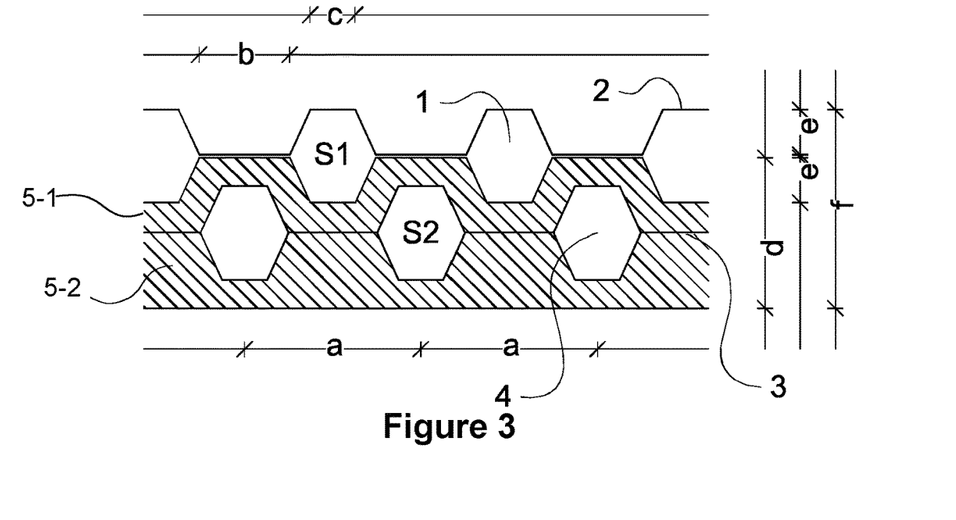
FIGS. 3, 4, and 5 illustrate cross-sections of a roof panel, in accordance with an exemplary embodiment of the present disclosure.

A body of the active roof panel 3 includes a heat insulation (e.g., heat insulation 5 of FIG. 3). The heat insulation 3 interposes between an external surface (e.g., exterior) of the roof panel 3 (e.g., surface 2 of FIG. 2) and an internal surface of the roof panel 3 (e.g., lower surface of roof panel 3 of FIG. 2). Furthermore, the roof panel 3 includes a plurality of side walls. From this, an upper surface of the heat insulation 5 interfaces with a lower surface of the exterior surface 2, while a lower surface of the heat simulation 5 interfaces with an upper surface of the interior surface of the roof panel 3. In this way, the external surface, the internal surface, and the side walls with the heat insulation 5 interposing in-between provide a thermal heat collection system for a collection and/or dissipation of energy. Furthermore, in some embodiments, the exterior surface 2 is grounded to one or more side walls of the roof panel 3, allowing for safe utilization of the roof panel on as a roof of a structure. For instance, if the exterior surface 2 is a profiled metal sheet, grounding the exterior surface 2 to the one or more side walls of the roof panel 3 ensures the safety of an electrical component coupled to the roof panel 3 and/or a subject connected to the roof panel 3. In some embodiments, the exterior surface 2 includes a metal material, which allows for an improved exchange of energy between the roof panel 3 and the environment. Furthermore, use of a metal exterior surface 2 allows for a structure of the roof panel to be protected against the environment and impacts, the sidewall of the hot air duct 1, heat absorbent surface. In some embodiments, a length of the roof panel is in a range of from 8 meters to 15 meters, from 10 meters to 15 meters, or from 11 meters to 13 meters.

Through the exterior surface 2 and the heat insulation 5, the roof panel 3 includes a plurality of hot air ducts (e.g., hot air ducts 1 of FIG. 4) formed below the exterior surface 2. From this, each hot air duct 1 in the plurality of hot air ducts 1 has an upper end portion that interfaces with the lower end portion of the exterior surface 2. In some embodiments, the plurality of hot air ducts 1 includes one hot air duct. However, the present disclosure is not limited thereto. For instance, in some embodiments, the plurality of hot air ducts 1 includes at least two hot air ducts, at least 4 hot air ducts, at least 6 hot air ducts, at least 10 hot air ducts, at least 15 hot air ducts, at least 25 hot air ducts, or at least 100 hot air ducts. By including at least two hot air ducts, the roof panel 3 includes an increased surface area having an interface with the exterior surface 2, allowing for a more efficient exchange of energy between the exterior surface 2 and the plurality of hot air ducts 1.

Figure 9A:
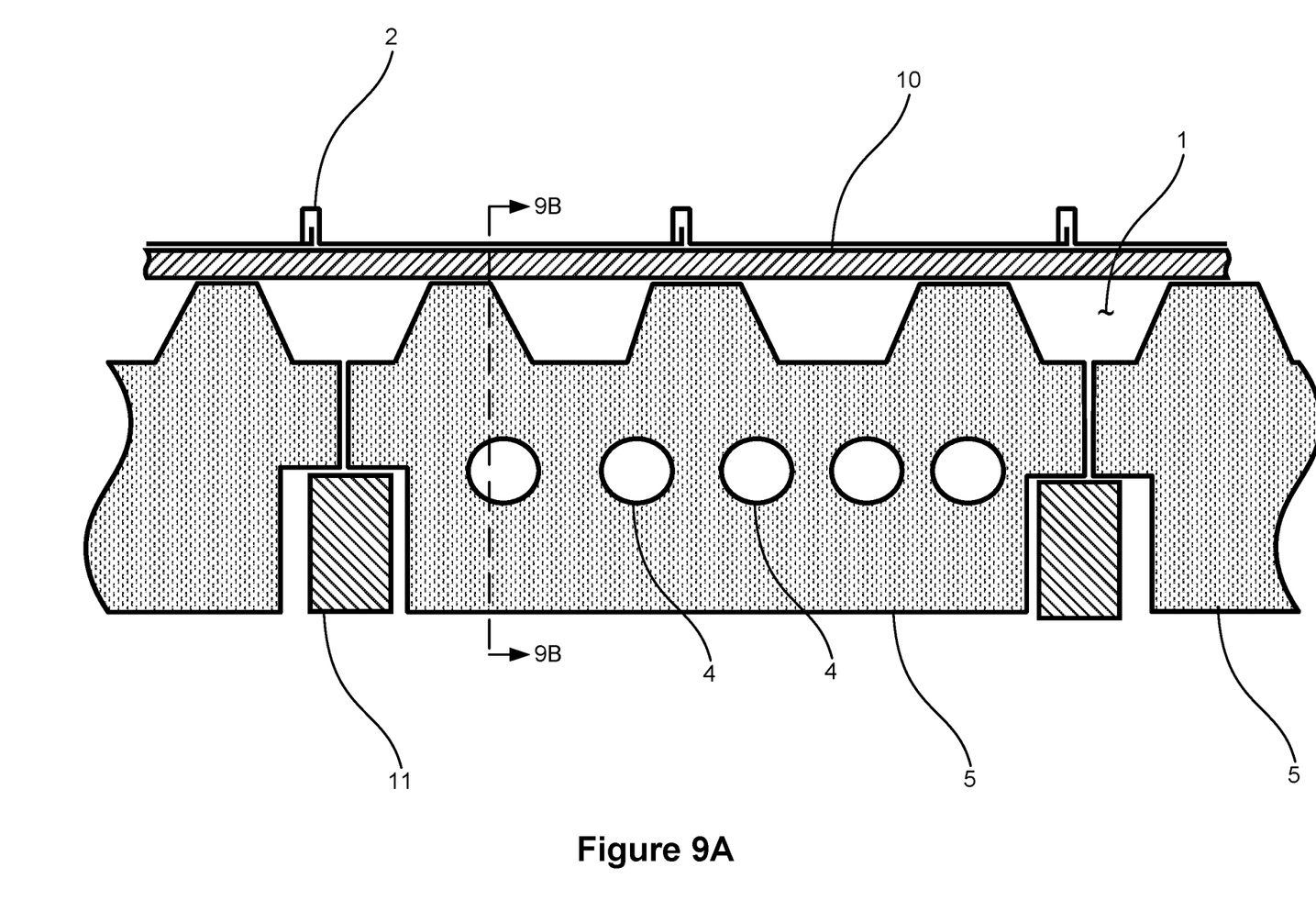
FIGS. 9A and 9B collectively illustrate a roof panel including a spacer and support for a structure, in accordance with an exemplary embodiment of the present disclosure.
Figure 9B:
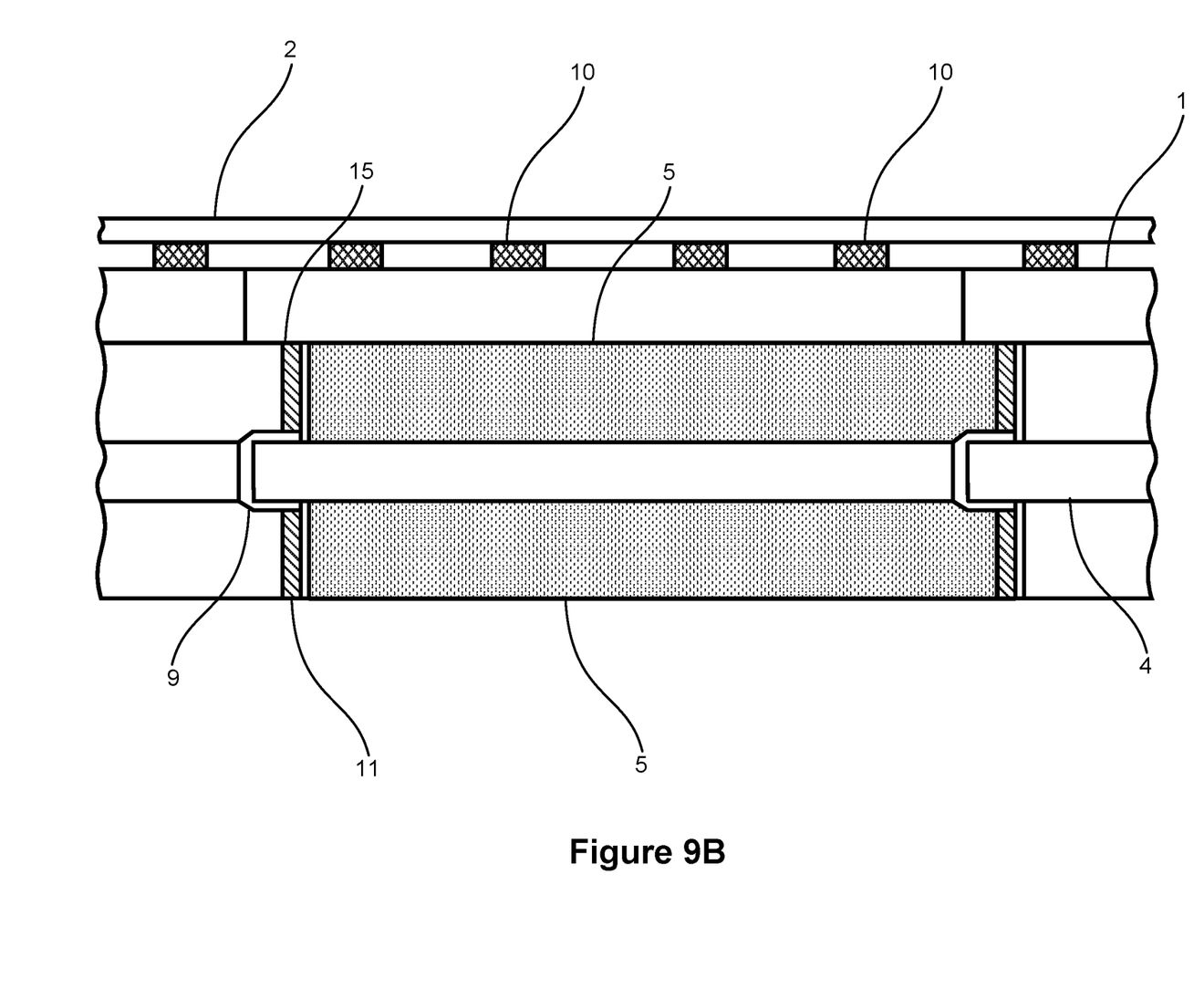

The roof panel 3 includes a plurality of cold air ducts (e.g., cold air ducts 4 of FIG. 9B). Each cold air duct 4 in the plurality of cold air ducts 4 is formed below the plurality of hot air ducts 1, such that a lower density fluid flows from the hot air ducts 1 to the cold air ducts 4. Furthermore, each cold air duct 4 is encompassed by the heat insulation 5, such that a circumference of each cold air duct 4 interfaces with the heat insulation 5. In some embodiments, the plurality of cold air ducts 4 includes one cold air duct. However, the present disclosure is not limited thereto. For instance, in some embodiments, the plurality of cold air ducts 4 includes at least two cold air ducts, at least 4 cold air ducts, at least 6 cold air ducts, at least 10 cold air ducts, at least 15 cold air ducts, at least 25 cold air ducts, or at least 100 cold air ducts. By including at least two cold air ducts 4, the roof panel 3 includes an increased surface area having an interface with the heat insulation 5, allowing for a more efficient retention of energy within the cold air ducts 4.

In some embodiments, each air duct in the plurality of hot air ducts 1 and/or the plurality of cold air ducts 4 is arranged running parallel in rafter direction of the structure. However, the present disclosure is not limited thereto. For instance, in some embodiments, each air duct in the plurality of hot air ducts 1 and/or the plurality of cold air ducts 4 is arranged running parallel in the purlin direction of the structure. In this way, in some embodiments, the plurality of hot air ducts 1, the plurality of cold air ducts 4, or both is arranged in one or more rows or collects if air ducts. For instance, in some embodiments, each hot air duct 1 in the plurality of hot air ducts 1 is formed in a corresponding row of hot air ducts 1 (e.g., a row of hot air ducts 1 of FIGS. 3, 4, and 5) and/or each cold air duct 4 in the plurality of cold air ducts 4 is formed in a corresponding row of cold air ducts 4. However, the present disclosure is not limited thereto. In some embodiments, a distance between each hot air duct in the plurality of hot air ducts 1 is uniform (e.g., a distance of 1 centimeter between each hot air duct 1). In some embodiments, a distance between each cold air duct in the plurality of cold air ducts 4 is uniform. Furthermore, in some embodiments, a distance between each respective duct in the plurality of hot air ducts 1 and cold air ducts 4 is uniform, such that an equal spacing exists between each respective duct. In this way, a distribution of energy within the roof panel 3 (e.g., a distribution of flow within the plurality of hot and/or cold air ducts 1,4) is less sporadic.

Figure 4:
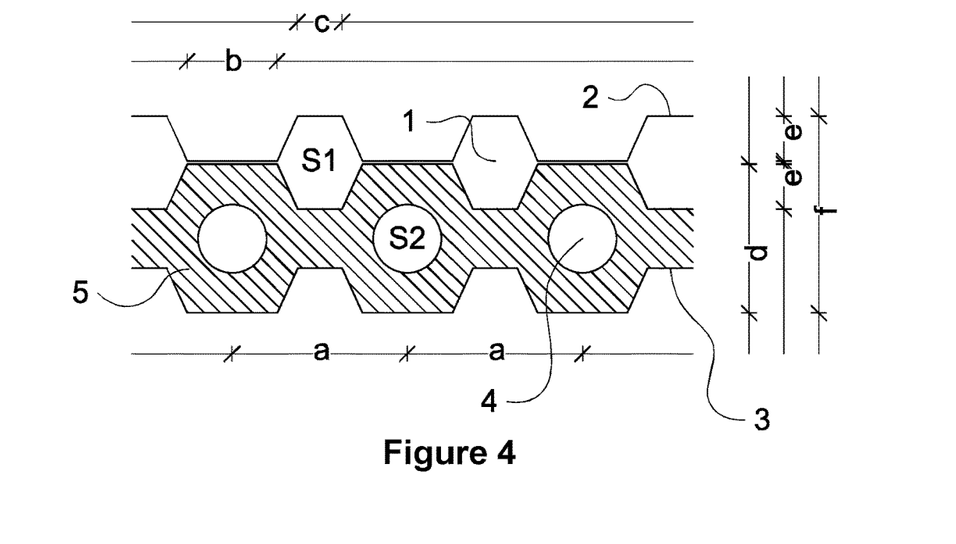

In some embodiments, each respective air duct in the plurality of hot air ducts 1 and/or the plurality of cold air ducts 4 includes a similar cross-sectional shape. For instance, referring briefly to FIGS. 3 and 5, in some embodiments, each respective duct in the plurality of hot air ducts 1 and the plurality of cold air ducts 4 includes a similar cross sectional shape. Referring to FIG. 4, in some embodiments, each respective hot air duct in the plurality of hot air ducts 1 includes a first cross-sectional shape and each respective cold air duct in the plurality of cold air ducts 4 includes a second cross-sectional shape that is different from the first cross sectional shape. In some embodiments, each respective hot air duct in the plurality of hot air ducts 1 includes a first cross-sectional area and each respective cold air duct in the plurality of cold air ducts 4 includes a second cross-sectional area. In some embodiments, the first cross-sectional area is different from the second cross-sectional area. In some embodiments, the cross-sectional shape of a respective air duct in the plurality of hot air ducts 1 and/or the plurality of cold air ducts 4 is a circle or an n-sided polygon, such as a triangle, a square, a pentagon, etc. However, the present disclosure is not limited thereto. By utilizing various cross-sectional shapes for the plurality of hot air ducts 1 and/or the plurality of cold air ducts 4, a region of interface between a respective air duct and the heat insulation 5 and/or the exterior surface is increased, improving an efficiency of the roof panel 3.

In some embodiments, the plurality of hot air ducts 1 is covered by the exterior surface 2 (e.g., profiled metal sheet), which facilitates absorbing energy from the environment. However, the present disclosure is not limited thereto. Referring briefly to FIGS. 9A and 9B, in some embodiments, a plurality of spaces 10 are disposed interposing between the plurality of hot air ducts 1 and the exterior surface 2. In some embodiments, the plurality of spacers 10 includes one spacer 10 that physically separates each hot air duct in the plurality of hot air ducts 1 and the exterior surface 2. In other embodiments, the plurality of spacers 10 includes at least two spacers, which separate a first hot air duct and a second hot air duct in the plurality of hot air ducts 1 with the exterior surface 2. For instance, in some embodiments, the plurality of spacers 10 prevent a first fluidic medium within the plurality of hot air ducts 1 from interfacing with the exterior surface 2, thereby increasing a gradient of energy within the roof panel 3. Furthermore, in some embodiments, the plurality of spacers 10 is configured to provide a turbulent flow within the plurality of hot air ducts 1.

At a lower portion and an upper end portion of the active roof panel 3, there are one or more chambers (e.g., first air reversing chamber 7 of FIG. 7, second air reversing chamber 8 of FIG. 6), that provide fluidic communication between the plurality of hot air ducts 1 and the plurality of cold air ducts 4. In this way, a first chamber 7 is formed at a first side wall of the roof panel 3 and a second chamber 8 is formed at a second side wall that opposes the first side wall of the roof panel 3. From this, the first chamber 7 provides fluidic communication at a corresponding lower end portion of each respective air duct in the plurality of hot air ducts 1 and the plurality of cold air ducts 4. Accordingly, the second chamber 8 is formed by a second side wall in plurality of side walls. In this way, the second chamber 8 provides fluidic communication between the plurality of hot air ducts 1 and the plurality of cold air ducts 4 at a second end portion of each respective channel in the plurality of hot air ducts 1 and the plurality of cold air ducts 4. For instance, referring briefly to FIG. 2, the first chamber 7 provides fluidic communication at the lower end portion of the roof panel 3, such while second chamber 8 provides fluidic communication at the upper end portion of the roof panel 3. In this way, a gradient is formed by the chambers 7, 8 and through the plurality of hot air ducts 1 and the plurality of cold air ducts 4 to provide a flow of fluid within the roof panel 3.

In some embodiments, a length from a first side wall to a second side wall is in a range of from 5 meters to 20 meters, from 7.5 meters to 17.5 meters, from 10 meters to 15 meters, or from 1 meters to 25 meters. In some embodiments, an aspect ratio of the roof panel 3 is in a range of from 1:1, 1:2, 1:3, 1:4, or 1:5. However, the present disclosure is not limited thereto.

Figure 5:
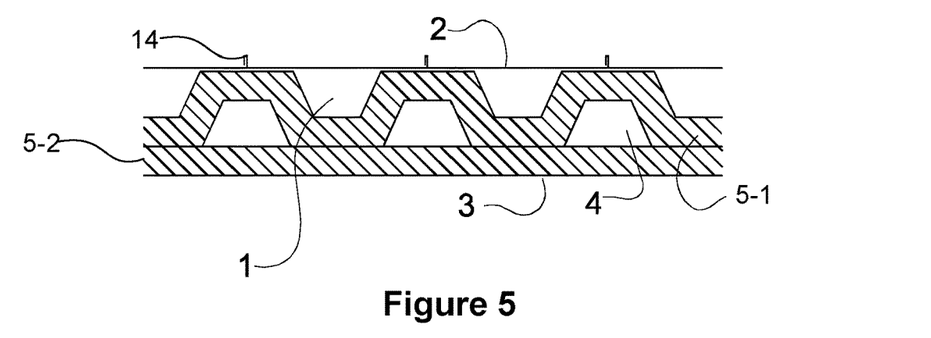

In some embodiments, the heat insulation 5 of the roof panel 3 includes one or more layers of heat insulation 5, such a first layer of the heat insulation 5 and a second layer of the heat insulation 5 (e.g., first heat insulation layer 5-1 and second heat insulation layer 5-2 of FIG. 3, first heat insulation layer 5-1 and second heat insulation layer 5-2 of FIG. 5, etc.). For instance, referring to FIG. 3, in some embodiments, the first heat insulation layer 5-1 is displayed interposing between the exterior surface 2 and an upper surface of the second heat insulation layer 5-2. In this way, the plurality of hot air ducts 1 is fully encompassed by the first heat insulation layer 5-1. Moreover, the second heat insulation layer is formed interposing between a lower end portion of the first heat insulation layer 5-1 and the interior surface of the roof panel 3. From this, the plurality of cold air ducts 4 is formed interposing between the lower end surface of the first heat insulation layer 5-1 and the upper end surface of the second heat insulation layer 5-2. However, the present disclosure is not limited thereto. For instance, referring to FIG. 5, in some embodiments, the second heat insulation layer 5-2 is formed interposing between the lower end portion of the cold air ducts 4 and the interior surface of the roof panel 3. From this, the first heat insulation layer 5-1 is formed encompassing a lower surface of the plurality of hot air ducts 1 and an upper surface of the plurality of cold air ducts 4. However, the present disclosure is not limited thereto.

In some embodiments, the one or more side walls, the interior surface, the heat insulation 5 or a combination thereof includes a flame or fire retardant material, such that the heat insulation inhibits an ability of a flame to spread through the roof panel 3. For instance, in some embodiments, the heat insulation 5 is a flame retarded material, such as spun glass. In some embodiments, the heat insulation includes a composite material of different constituents, such as a combination of one or more profiled sheets, one or more plastic cross braces to enhance physical strength, one or more non-flammable (e.g., flame retardant) fiber-reinforced foams, one or more glass foams, or a combination thereof. Furthermore, in some embodiments, the side walls and/or the interior surface of the roof panel 3 includes a further flame or fire retarded material. In some embodiments, the flame or fire retardant material includes a treatment to a first material that would otherwise be flammable, in order to form the flame or fire retardant material. However, the present disclosure is not limited thereto. In some embodiments, the heat insulation 5 includes an inorganic material that provides a flame retardant capability. For instance in some embodiments, the heat insulation 5 includes an inorganic material including silicon and aluminum oxides, hydroxides, or a combination thereof. Additional details and information regarding flame retardants can be found from Brown, S., 1998, "Flame retardants: Inorganic oxide and hydroxide systems," Plastics Additives, pg. 287, which is hereby incorporated by reference in its entirety.

In the second chamber 8 and an upper end portion of each air duct in the plurality of cold air ducts 4 of the roof panel 3 interfaces with a heat exchange mechanism (e.g., heat exchange mechanism 6 of FIG. 2, heat exchange mechanism 6 of FIG. 6, etc.), such as a cooling device. In some embodiments, the heat exchange mechanism 6 is disposed at an upper end portion of one or more cold air ducts 4 in the plurality of cold air ducts. For instance, in some embodiments, the heat exchange mechanism 6 includes one or more protrusions (e.g., fins) that enter a portion of the respective cold air duct 4. From this, the heat exchange mechanism 6 provides a greater gradient in energy between an upper end portion and the lower end portion of the roof panel 3, for optimal exchange of energy.

Figure 10:
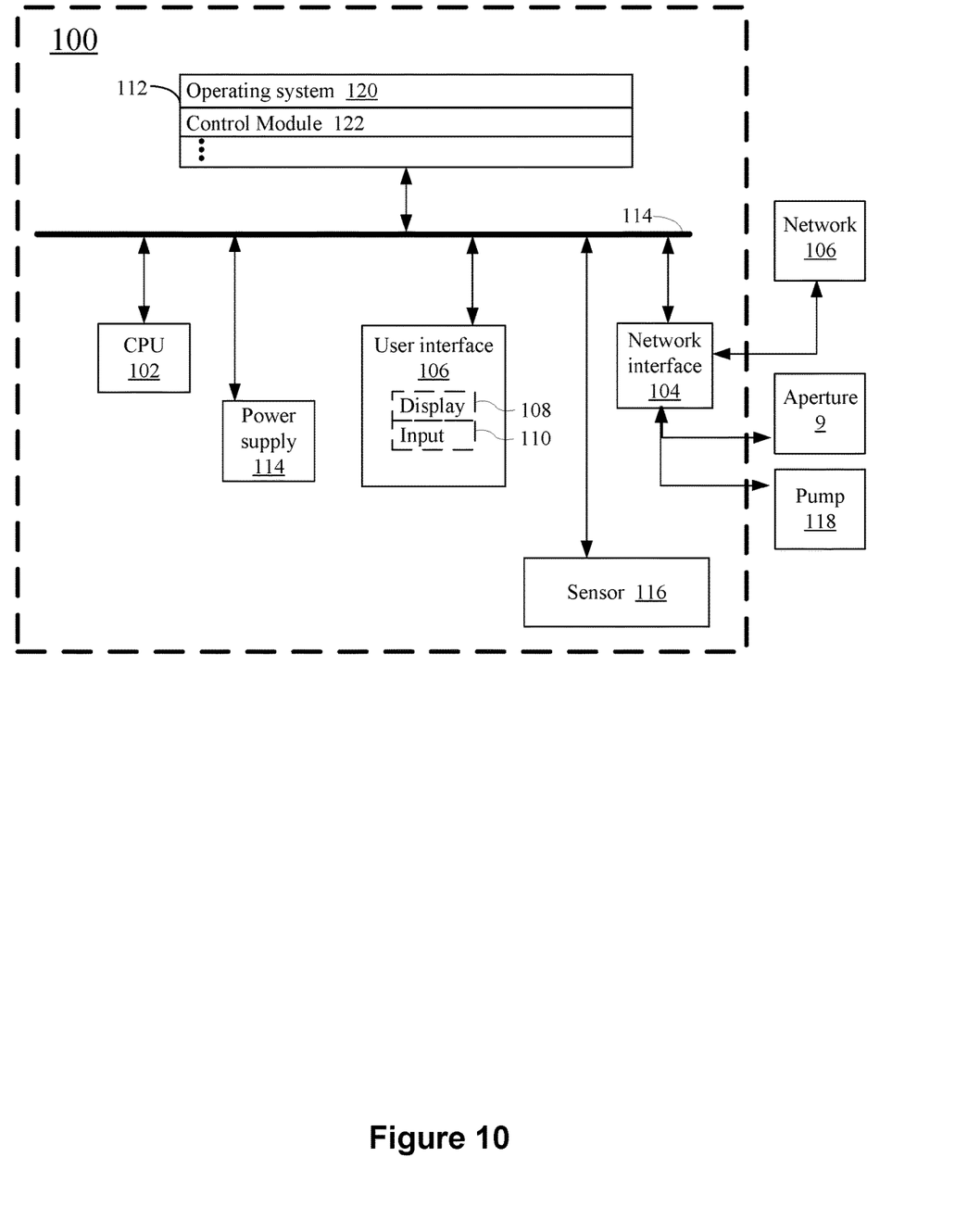
FIG. 10 illustrates an exemplary controller of a roof panel, in accordance with an exemplary embodiment of the present disclosure.

Referring briefly to FIG. 10, in some embodiments, the heat exchange mechanism 6 includes a controller (e.g., controller 100 of FIG. 10). FIG. 10 provides a description of an exemplary controller 100 that can be used with the roof panel 3 of the present disclosure. In some embodiments, a controller 100 includes a smart phone (e.g., an iPhone, an Android device, etc.), a laptop computer, a tablet computer, a desktop computer, a wearable device (e.g., a smart watch, a heads-up display (HUD) device, etc.), a television (e.g., a smart television), or another form of electronic device such as a gaming console, a stand-alone device, and the like. In this way, the controller 100 provides a subject control of the roof panel 3 from a remote location away from the roof panel 3 (e.g., without physical access to the roof panel 3). However, the present disclosure is not limited thereto. For instance, in some embodiments, the controller is disposed within, or in electrical communication with (e.g., wired to), the roof panel 3.

The controller 100 of FIG. 10 has one or more processing units (CPU's) 102, a network 106, a network interface 104, a memory 112 (e.g., random access memory), a user interface 106, the user interface 106 including an optional display 108 and an optional input 110 (e.g., keyboard, keypad, touch screen, etc.), and one or more communication busses 114 for interconnecting the aforementioned components of the controller 100.

In some embodiments, the input 110 is a touch-sensitive display, such as a touch-sensitive surface. In some embodiments, the user interface 106 includes one or more soft keyboard embodiments. In some embodiments, the soft keyboard embodiments include standard (QWERTY) and or non-standard configurations of symbols on the displayed icons. The input 110 and/or the user interface 106 is utilized by an end-user of the respective controller 100 (e.g., a respective subject) to input various commands (e.g., modify a state of an aperture 9, modify a state of a pump 118, etc.) for the roof panel 3.

It should be appreciated that the controller 100 illustrated in FIG. 10 is only one example of a multifunction device that may be used. Thus, the controller 100 optionally has more or fewer components than shown, optionally combines two or more components, or optionally has a different configuration or arrangement of the components. The various components shown in FIG. 10 are implemented in hardware, software, firmware, or a combination thereof, including one or more signal processing and/or application specific integrated circuits.

Memory 112 of the controller 100 illustrated in FIG. 10 optionally includes high-speed random access memory and optionally also includes non-volatile memory, such as one or more magnetic disk storage devices, flash memory devices, or other non-volatile solid-state memory devices.

In some embodiments, the network interface 104 converts electrical signals to from electromagnetic signals and communicates with network 106 and one or more roof panels 3, one or more apertures 9, one or more pumps 118, or a combination thereof via the electromagnetic signals. The network interface 104 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The network interface 104 optionally communicates with the network 106. In some embodiments, the network interface 104 does not include RF circuitry and, in fact, is connected to the communication network 106 through one or more hard wires (e.g., an optical cable, a coaxial cable, or the like).

In some embodiments, the memory 112 of the controller 100 stores:
- an operating system 120 that includes procedures for handling various basic system services; and
- a control module 122 for communicating one or more instructions associated with the control of the one or more roof panels 3.

As illustrated in FIG. 10, a controller 100 preferably includes an operating system 120 that includes procedures for handling various basic system services. The operating system 120 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

A control module 122 is a group of instructions that, when executed by a processor (e.g., CPU(s) 102), generates one or more instructions associated with a control of one or more roof panels 3. In some embodiments, the one or more roof panels 3 is associated with a first structure, such that the controller 100 facilitates control of each roof panel 3 associated with the first structure. In some embodiments, the one or more roof panels 3 is associated with a first stricture and a second structure, allowing for robust control of multiple roof panels 3 associated with various structures. In some embodiments, the instructions provided by the control module 122 include one or more user defined instructions, one or more predetermined instructions, or both. In this way, the controller 100 can provide instructions for the one or more pumps 118 and/or the one or more apertures 9 associated with the one or more panels 3 that are either tailored by a subject or tailored through an evaluation of data associated with the roof panel 3. For instance, in some embodiments, the control module 120 receives data from the roof panel 3 (e.g., data related to a temperature at a region of the roof panel 3) and either stores the data or communicates the data to a remote device. This data is then evaluated, upon which one or more instructions is formed that the controller 100 can use. In this way, the controller 100 can provide instructions for the one or more roof panels 3 based on data received from the one or more roof panels 3, in order to optimize operation of the one or more roof panels. Specifically, in some embodiments, the one or more instructions include an instruction to open and/or close an aperture 9 of the first chamber 7, the second chamber 8, the plurality of cold air ducts 4, or a combination thereof. In some embodiments, the one or more instructions include an instruction to control a velocity and/or a flow path of the first fluidic medium within the first chamber 7, the second chamber 8, the plurality of cold air ducts 4, the plurality of hot air ducts 1, or a combination thereof.

In some embodiments, the controller 10 has any or all of the circuitry, hardware components, and software components found in the system depicted in FIG. 10. In the interest of brevity and clarity, only a few of the possible components of the controller 100 are shown to better emphasize the additional software modules that are installed on the controller 100.

The heat exchange mechanism includes a pump (e.g., pump 118 of FIG. 10) coupled to the controller 100. From this, the pump 118 is configured to control a flow of a second fluidic medium within the heat exchange mechanism 6 (e.g., an internal flow within the heat exchange mechanism 6). In some embodiments, the controller 100 is configured to selectively activate the pump 118 in accordance with one or more instructions (e.g., a user defined instruction, a predetermined instruction, etc.). In some embodiments, the one or more defined instructions include a predetermined temperature, such that the heat exchange mechanism 6 activates in accordance with a determination that a threshold temperature has been satisfied at a region of the roof panel 3 (e.g., a the heat exchange mechanism 6, at a respective hot air duct 1, at a respective cold air duct 4, the first chamber 7, the second chamber 8, or a combination thereof such as an internal temperature differential) and/or the environment (e.g., a temperature differentia between a region of the roof panel 3 and the environment). In some embodiments, the controller 100 is in communication with a storage mechanism (e.g., a memory of a remote device) through a communications network 106 (e.g., a WiFi communication network, a Bluetooth communication, a near-field communication, etc.), allowing the controller 100 to communicate data associated with the roof panel 3. In this way, the roof panel 3 allows for a remote evaluation of not only data derived from the roof panel 3 (e.g., historical trend data of temperatures with respective to time and/or instructions, etc.) but also a real-time evaluation of a state of the roof panel 3. For instance, in some embodiments, Additionally, in some embodiments, the heat exchange mechanism 6 includes a circulation mechanism, such as a ventilator or a mechanism to provide a forced flow of the first medium. Through the circulation mechanism, the heat exchange mechanism 6 can provide a control of a flow of the first fluidic medium of the plurality of hot air ducts 1 and the plurality of cold air ducts 4. In this way, the heat exchange mechanism 6 can uniquely control the flow of both the first fluidic medium and the second fluidic medium.

Figure 1:
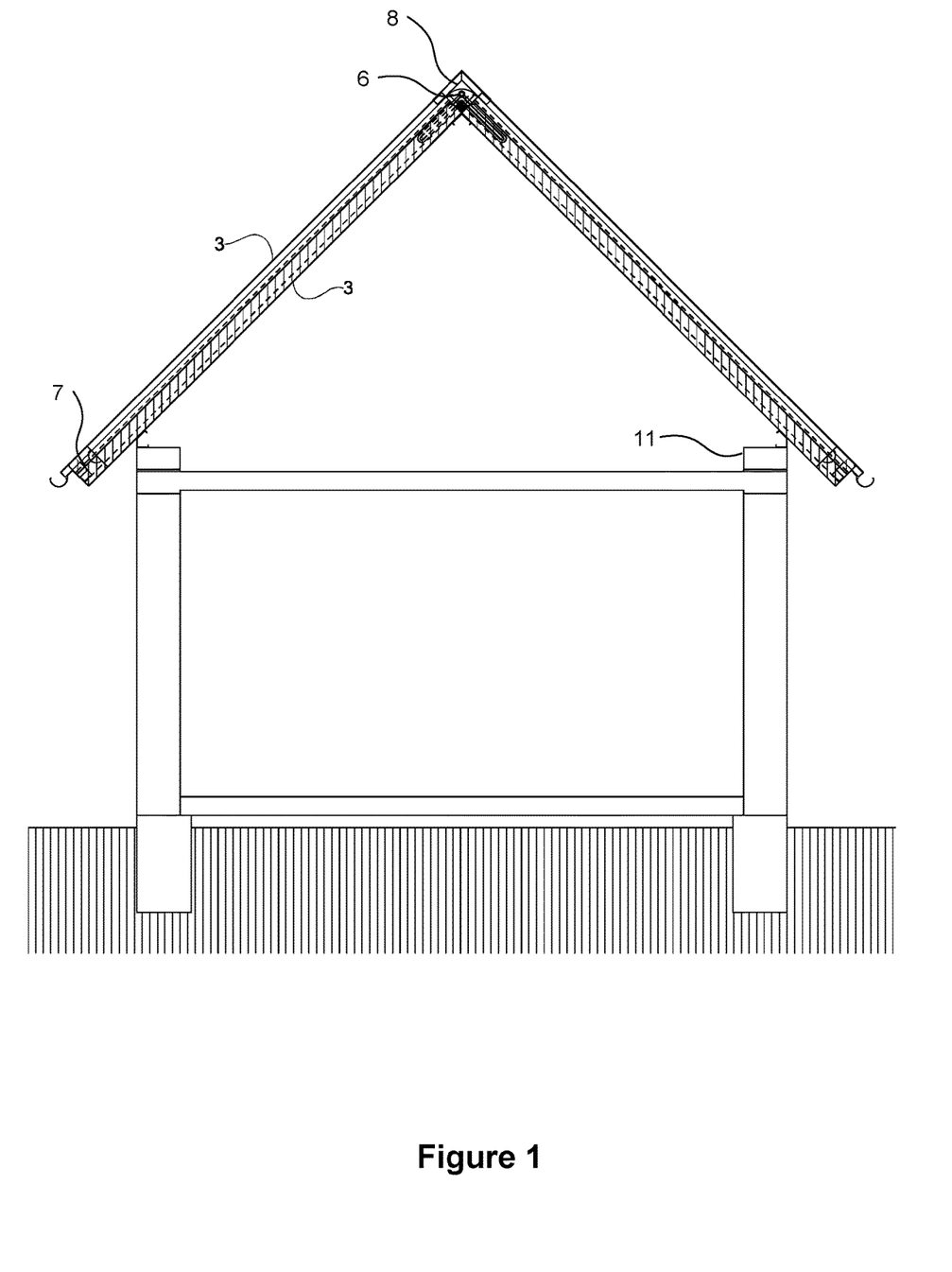
FIG. 1 illustrates a roof panel including a roof of a structure, in accordance with an exemplary embodiment of the present disclosure.

In some embodiments, the heat exchange mechanism 6 includes a heat sink that interfaces with the first fluidic medium and the second fluidic medium. In this way, the heat sink of the heat exchange mechanism facilities a transfer of energy between the first fluidic medium and the second fluidic medium. In some embodiments, the heat sink comprises a plurality of fins disposed in the second chamber. For instance, referring briefly to FIG. 1, the heat exchange mechanism 6 includes fins that protrude downwardly towards the first chamber 7. The fins increase a surface area of the heat sink, allowing for an improved exchange of heat between the heat exchange mechanism 6 and the roof panel 3. In some embodiments, the heat sink is integrally formed with the exterior surface 2 of the heat collector device 3. For instance, in some embodiments, the exterior surface 2 includes an upper profiled surface including a first plurality of protrusions (e.g., protrusions 14 of FIG. 5, protrusion 14 of FIG. 8, etc.) and a lower profiled surface including a second plurality of protrusions (e.g., protrusions 16 of FIG. 8) that form fins of the heat exchange mechanism 6. In this way, the first plurality of protrusions 14 increases a surface area of the exterior surface 2 interfacing with the environment, allowing for an improved exchange of energy between the environment and the roof panel 3. Moreover, in some embodiments, the second plurality of protrusions 16 physically separate each respective hot air duct in the plurality of hot air ducts 1, further increasing a surface area of the exterior surface 2 that interfaces with the plurality of hot air ducts 1, which increases an efficiency of energy transfer for the roof panel 3.

Figure 8:
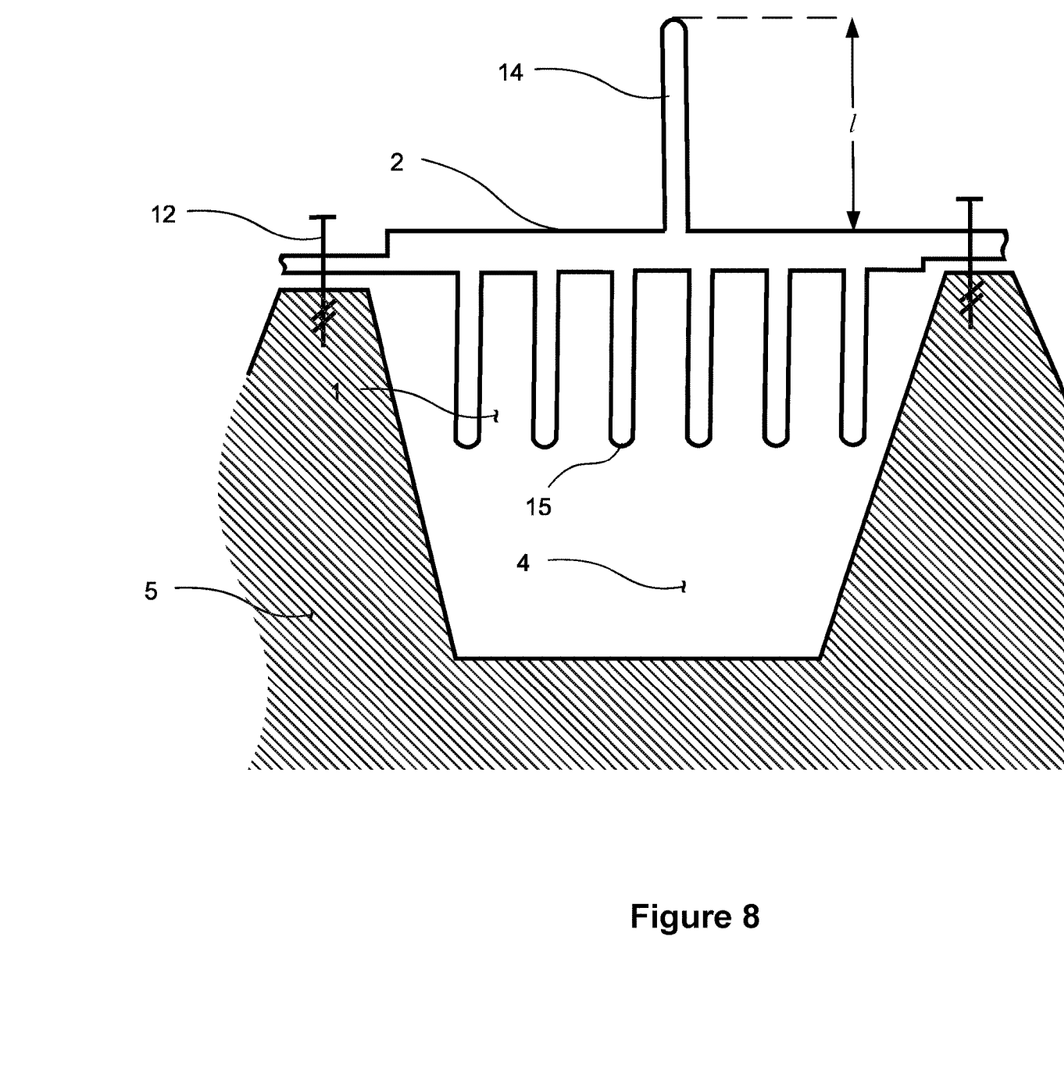
FIG. 8 illustrates a roof panel including a profiled exterior surface, in accordance with an exemplary embodiment of the present disclosure.

For instance, referring briefly to FIG. 8, in some embodiments, the exterior surface 2 of the roof panel 3 includes a profiled surface, such as a profiled upper surface and/or a profiled lower surface of the exterior surface 2. As illustrated, in some embodiments, the profiled surface of the exterior surface 2 of the roof panel 3 includes a recessed profiled surface, such as one or more grooves formed on the upper surface of the exterior surface 2. In some embodiments, the profiled surface includes a protruding profiled surface, such as one or more fins or raised portions extending upwardly from the exterior surface 2. For instance, FIGS. 5 and 8 illustrate a respective embodiment of a heat collector 3 having an exterior surface 2 with a protruding profiled surface 14. In some embodiments, a vertical displacement of the profiled surface of the exterior surface 2 (e.g., distance 1 of FIG. 8) is in a range in between 0.5 centimeters and 5 centimeters. In some embodiments, the protruding profiled surface 14 of the exterior surface 2 is configured as a store-resistance profiling, to provide a resistance to environmental effects, such as high wind speeds and/or lightning. However, the present disclosure is not limited thereto. For instance, in some embodiments, the profiling of the exterior surface 2 includes a combination of protrusions and/or recessed portions. In this way, in some embodiments, the profiling of the exterior surface 2 is configured to increase a surface area of the exterior surface 2 that interfaces with the environment, in order to maximize an ability of the roof panel 3 to exchange heat with the environment. In some embodiments, a profiling of a surface of a respective air duct in the plurality of hot air ducts 1 and/or the plurality of cold air ducts 4 is configured to provide a predetermine flow characteristic within the respective air duct. For instance, in some embodiments, the profiled surface of a respective hot air duct 1 is configured to provide a turbulent flow of a medium within the respective hot air duct 1. However, the present disclosure is not limited thereto. In some embodiments, the profiled surface of a respective hot air duct 1 is configured to provide a laminar flow of the medium (e.g., the first medium). In some embodiments, the plurality of hot air ducts include a turbulent flow. In some embodiments, the plurality of cold air ducts include a laminar flow.

In some embodiments, the heat exchange mechanism 6 further includes a sensor (e.g., sensor 116) coupled to the controller 100. In some embodiments, the sensor 116 is configured to determine an internal temperature gradient of the heat collector device 4. For instance, in some embodiments, the sensor 116 includes a thermometer. However, the present disclosure is not limited thereto. For instance, in some embodiments, the sensor 116 is configured to determine an intensity of light at a region of the roof panel 3 (e.g., via an objective lens in communication with a two-dimensional pixelated detector, a camera, etc.). In some embodiments, the sensor 116 is configured to control an operation of the controller 100 in accordance with a function that optimizes a maximum yield of an exchange of energy within the roof panel 3 (e.g., between a respective cold air duct 4 and a respective hot air duct 1) and/or between the roof panel 3 and the environment. However, the present disclosure is not limited thereto.

In some embodiments, the plurality of hot air ducts 1 and the plurality of cold air ducts include the first fluidic medium. In this way, the first fluidic medium fills the cold air ducts 4 and the hot air ducts 1. In some embodiments, the first chamber 7 and the second chamber 8 are further filled with the first fluidic medium, allowing flow a flow path between the aforementioned ducts and chambers of the roof panel. In some embodiments, the first fluidic medium includes a liquid medium (e.g., a liquid refrigerant, water, etc.), a gaseous medium, or a combination thereof. Furthermore, in some embodiments, the first fluidic medium is at an equal pressure as the environment (e.g., the first fluidic medium is at atmospheric pressure). However, the present disclosure is not limited thereto. For instance, in some embodiments, the first fluidic is at a higher pressure than the environment, at a lower pressure than the environment, or a combination thereof. By warming and cooling the first medium, a flow path starts in the plurality of hot air ducts 1 and the plurality of cold air ducts 4 through the first chamber 7 and the second chamber 8, conveying the energy (e.g., heat) from the exterior sheet eventually to the cooling tubes of the heat exchange mechanism 6, where the energy is further utilized (e.g., stored in or used by the structure).

In some embodiments, the roof panel 3 spans an entire length of a roof of the structure, such that a third side wall and an opposing fourth side wall of the roof panel include a sidewall portion of the structure. However, the present disclosure is not limited thereto. In some embodiments, the roof panel 3 is configurable as a plurality of roof panels 3 that form the roof of the structure. For instance, in some embodiments, the third side wall of a first roof panel 3 includes a first mating mechanism, which is further configured to mate with a fourth mating mechanism of the fourth side wall of the first roof panel 3. In this way, the third side wall of the first wall panel 3 can mate with a corresponding fourth side wall of a second roof panel 3. Setting up the active roof panels 3 next to each other by the sides walls allows for the present disclosure to provide energy collection capabilities for large scale structures. Furthermore, in some embodiments, the matching mechanisms are either detachable or fixed, allowing for more robust constructions.

Figure 6:
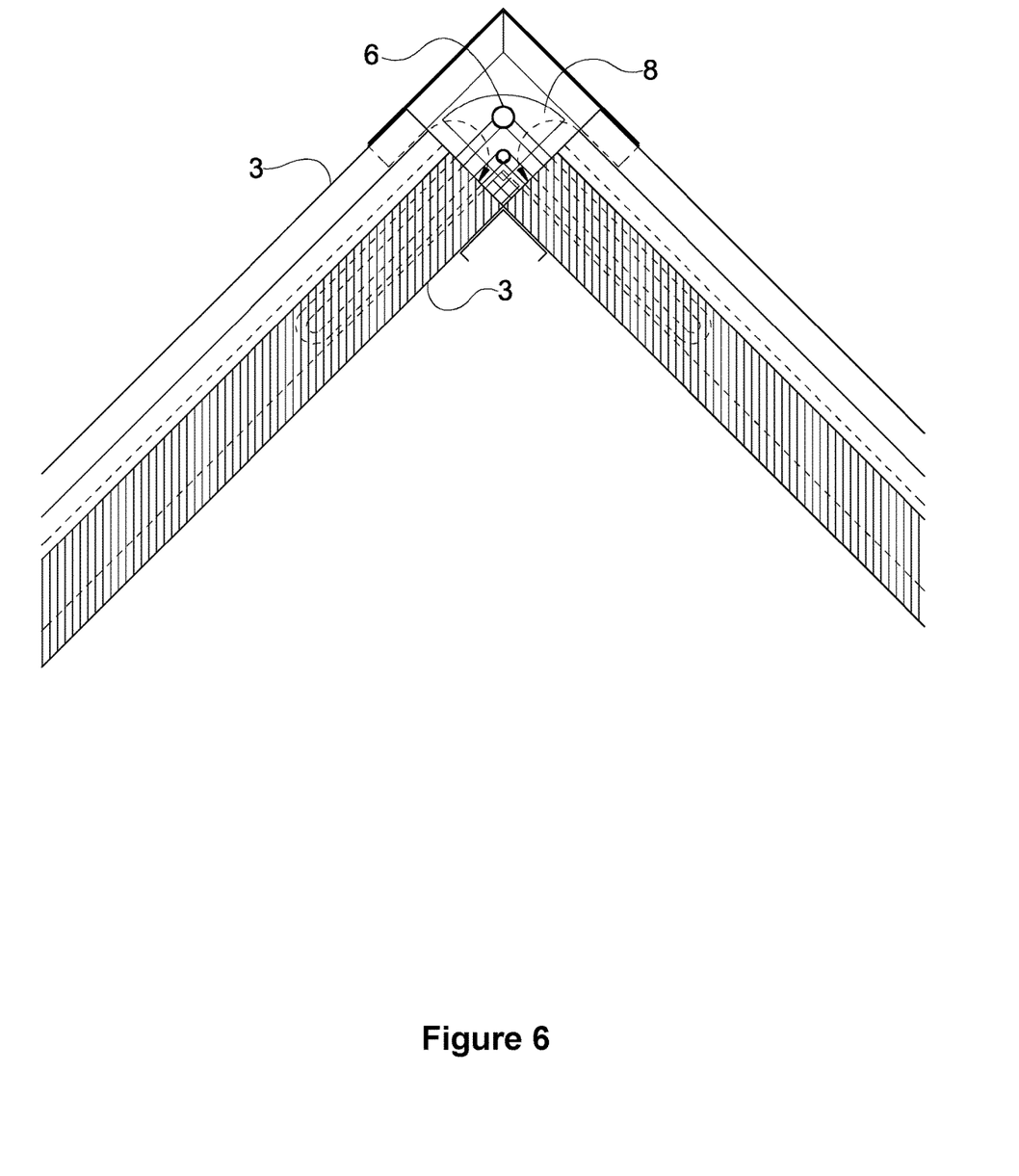
FIG. 6 illustrates a roof panel including a first air reversing chamber providing fluidic communication between a plurality of hot air ducts and a plurality of cold air ducts, and a heat mechanism partly concealed and represented by a dotted line, in accordance with an exemplary embodiment of the present disclosure.

Referring to FIGS. 6 and 7, the first chamber 7 and the second chamber 8 are utilized for forming a flow path connecting the plurality of hot air ducts 1 and the plurality of cold air ducts 4. In some embodiments, the first chamber and the second chamber 8 are provided interconnection of the respective ends of the plurality of hot air ducts 1 and the plurality of cold air ducts 4 in a crossover manner. For instance, in some embodiments, the first chamber 7 and the second chamber 8 interconnect each respective air duct in the plurality of hot air ducts 1 and the plurality of cold air ducts 4. In some embodiments, the first chamber 7 and the second chamber 9 interconnect a corresponding hot air duct 1 and a corresponding cold air duct 4, such that each pair of the corresponding hot air duct 1 and the corresponding cold air duct 4 form a closed flow path. However, the present disclosure is not limited thereto. In some embodiments, the first chamber 1, the second chamber 8, or a combination thereof is running in the direction of purlin, without interruption, throughout the corresponding ends of the plurality of hot air ducts 1 and the plurality of cold air ducts 4 (e.g., at a base purlin and/or a crest of the structure).

In some embodiments, the first chamber 7, the second chamber 8, or a combination thereof includes one or more apertures (e.g., aperture 9 of FIG. 7, aperture 9 of FIG. 9B) that allow for fluidic communication between the roof panel 3 and the environment. For instance, in some embodiments, the one or more apertures 9 provide a capacity vent pressure and/or moisture within the roof panel 3, and/or to control a flow of the first fluidic medium (e.g., a velocity of the first fluidic medium, a flow path of the first fluidic medium, etc.). In some embodiments, the one or more apertures 9 are disposed at opposite end portions of the first chamber 7 and/or the second chamber 8 (e.g., a first aperture 9-1 at a first end portion of the first chamber 7 and a second aperture 9-2 at a second end portion of the first chamber 7; a first aperture 9-1 at a first end portion of the first chamber 7 and a second aperture 9-2 at a second end portion of the second chamber 8, etc.). In some embodiments, the one or more apertures 9 is in communication with the controller 100, such that the one or more apertures 9 is configurable between a first state (e.g., an ON state) and a second state (e.g., an OFF state). In some embodiments, the one or more apertures 9 is configurable between a first diameter and a second diameter through the controller 100. In some embodiments, the one or more apertures 9 include a fitting mechanism, allowing the aperture to couple with one or more auxiliary devices. In some embodiments, the fitting mechanism allows for one way communication between the aperture 9 and the environment, such as a one way release of pressure and/or fluid from the roof panel 3 to the environment. In this way, in some embodiments, the fitting mechanism of the aperture 9 provides a seal between the environment and the first fluidic medium. However, the present disclosure is not limited thereto. By utilizing the one or more apertures 9, such that the roof panel 3 can provide a closed system, the roof panel 3 can utilize higher internal pressures for the first fluidic medium and/or a higher molecular weight gases and/or mixtures of fluidic mediums in order to increase a density of circulating medium. In this way, a higher specific heat value is provided for the first fluidic medium to allow for more efficient operation of the roof panel 3.

In some embodiments, a pair of opposing side walls each include a respective first support mechanism (e.g., first support mechanism 15 of FIG. 9B). In some embodiments, each of the first side wall and the second side wall includes a corresponding first support mechanism 15 configured to provide structural rigidity to the roof panel 3. For instance, in some embodiments, the heat insulation 5 includes a brittle material that is susceptible to fracture (e.g., during transportation and/or installation of the roof panel 3), such that the first support mechanism 15 can withhold the heat insulation 5 if a small portion of the heat insulation 5 fractures. However, the present disclosure is not limited thereto. In some embodiments, the first support mechanism 15 and/or each side wall in the plurality of side walls includes a profiled surface. In some embodiments, this profiled surface of the first support mechanism 15 and/or each side wall in the plurality of side walls is as described with respect to the profiling of the exterior surface 2.

in some embodiments, the side walls of the of hot air ducts, wherein each hot air duct in the plurality of hot air ducts of the heat collector device comprises shaped metal sheet.

In some embodiments, the heat exchange mechanism 6 includes the heat sink that further includes one or more cooling tube, such as one or more finned metal tubes located in the second chamber 8. In some embodiments, the heat exchange mechanism includes the one or more heat sinks (e.g., cooling tubes) in the upper end portion of a respective cold air duct in the plurality of cold air ducts 4 for extracting heat from the active roof panel 3. In some embodiments, each cold air duct in the plurality of cold air ducts 4 receives a portion of the heat exchange mechanism 6. In this way, in some embodiments, the heat exchange mechanism 6 in the second chamber 8 in the direction of the crest of the structure and besides of cooling distribute the cooling medium to the U shaped cooling tubes 6 located at the upper end of the cold air duct 4, functioning to set the temperature of the forgoing circulating air. In some embodiments, the second fluidic medium includes a liquid refrigerant gas defined by a variable temperature heat pump (e.g., pump 118 coupled with controller 100).

In some embodiments, the first fluidic medium in the plurality of hot air ducts 1 and the plurality of cold air ducts 4 is at the same pressure as the environment, such as at atmospheric pressure. However, the present disclosure is not limited thereto. In some embodiments, the first fluidic medium is at a higher pressure than the environment. Furthermore, in some embodiments, a density of the first fluidic medium is greater than the environment.

Referring briefly to FIGS. 9A and 9B, in some embodiments, the active roof panel 3 is supported by a purlin and/or the crest of the structure. For instance, a first rafter 11 of FIG. 9A supports a heat insulation 5 of the roof panel 3, allowing for the roof panel 3 to form an integral portion of the structure. In this way, one skilled in the art is not required to construct rafters in the structure or further modify the structure, such as reinforcing a foundation of the structure, when the structure includes the roof panel 3 of the present disclosure. Moreover, since the active roof panels 3 are configurable to the direction of the purlins and fixable to the rafters then, there is no need to construct additional purlins, such that less purlins than normally required can now be utilized. In this way, a required strength of the supporting beams for the structure is replaced by the active roof panel 3.

In some embodiments, the active roof panels 3 is fixed to one or more supporting beams of a structure, for instance, in one of several ways known to one of skill in the art such as screwing by steel sections (e.g., FIG. 7). In some embodiments, the active roof panels 3 are fixed to each other in several ways, such as by foaming glue or the mating mechanism of the third and fourth side walls. In some embodiments, an installation of the exterior 2 happen either in the factory of the active roof panel 3 or on the spot of the construction either to the direction of rafters or to purlins by applying overlapping onto each other to achieve watertight cover Assembling together the first and second chambers 7, 8 and the aperture 9 and the heat exchange mechanism 6 favorable used vent and the ventilation windows the completion of active roof has been made ready.

As a non-limiting example of an implementation of a roof panel 3 configured as a roof of a structure, consider solar radiation and/or an environmental temperature gradient that warms the upper surface of the exterior surface 2 having includes a metal material. The first fluid medium in the plurality of hot air ducts 1 exchanges energy with the exterior surface 2, raising to a temperature of the exterior surface 2. In this way, the first fluidic medium in the plurality of hot air ducts 1 expands in volume and decrease in density. Accordingly, heavier first fluidic medium in the plurality of cold air ducts 4 enters the plurality of hot air ducts 1 through the first chamber 7 by gravity, and pushes hotter first fluidic medium to the second chamber 8. The fluidic medium in the second chamber 8 exchanges energy (e.g., cools down) by interacting with (e.g., interfacing with) the heat exchange mechanism 6 and lowers through to the plurality of cold air ducts 4. In some embodiments, the energy is further exchanged with the heat exchange mechanism through one or more protrusions of the heat exchange mechanism 6 in the plurality of cold air ducts 4. The first fluidic medium when cooling down has an increasing density, further lowering from the second chamber to the first chamber 7 through the plurality of cold air ducts 4. The continuous heating and cooling described supra generates a self-circulation of the first fluidic medium in the plurality of hot air ducts 1 and the plurality of cold air ducts 4 via the first chamber 7 and the second chamber 8. Accumulated energy (e.g., heat) can then be conveyed out of the roof panel 3 by the second fluid medium circulating in the heat exchange mechanism 6. For instance, in some embodiments, the accumulated energy is stored in a remote structure, such as a buffer tank, or utilized by the structure of the roof panel 3.

In some embodiments, in a case of moderate or low-temperature gradient between the roof panel 3 and an environment, such that the first fluidic medium cannot efficiently circulate through gravity, as described supra, the one or more apertures 9 of the first chamber 7 and/or the second chamber 8 is used to control a flow (e.g., velocity) of the circulating first fluidic medium to achieve a maximally available yield of energy exchange between the roof panel 3 and the environment. In some embodiments, the one or more sensors of the roof panel 3 provide a self-learning process control (e.g., one or more user-defined instructions, one or more predetermined instructions) to achieve a maximally available yield of energy exchange between the roof panel 3 and the environment. Furthermore, in some embodiments, the pump 118 of the heat exchange mechanism 6 is utilized to forcibly remove energy from the first fluid medium and generate the environmental temperature gradient that warms the upper surface of the exterior surface 2. In this way, the roof panel 3 can operate at a wide range of environmental temperatures since the heat exchange mechanism 6 provide generate the environmental temperature gradient that warms the upper surface of the exterior surface 2, allowing the roof panel 3 to generate energy when the roof panel 3 would otherwise be inactive or inoperable.

When no more heat collection is required, by switching off the heat collection system of the roof panel 3 and controlled opening the one or more apertures 9 at the end portion of the first chamber 7 and/or the second chamber 8 through the controller 100, letting the accumulated hot air flow from the roof panel 3 through the aperture 9 to the environment, for instance, in order to protect the structure from the heat shock.

In some embodiments, the active roof panel 3 is utilized in a roof having different slopes (e.g., a structure with a roof having a first positive slope and a second negative slope, etc.). A slope and/or an orientation of the roof has a great influence on a maximum possible yield. In this way, in some embodiments, the roof panel 3 is sloped at a predetermined slope and/or orientation. In some embodiments, the predetermined slope and/or the predetermined orientation are determined based on a location of the roof panel 3, such as a geographical location (e.g., elevation, latitude, longitude, etc.).

What is claimed is:

1. A heat collector device, the heat collector comprising:
   an exterior surface exposed to an environment, the external surface comprising a metal material;
   an interior surface opposing the external surface;
   a plurality of side walls separating the exterior surface and the interior surface;
   a heat insulation interposing between the exterior surface and the interior surface;
   a plurality of hot air ducts, wherein each hot air duct in the plurality of hot air ducts comprises a first portion interfacing with the external surface and a second portion interfacing with the heat insulation;
   a plurality of cold air ducts, wherein each cold air duct in the plurality of cold air ducts is encompassed by the heat insulation;
   a first chamber formed by a first side wall in plurality of side walls, the first chamber providing fluidic communication between the plurality of hot air ducts and the plurality of cold air ducts at a first end portion of each respective air duct in the plurality of hot air ducts and the plurality of cold air ducts;
   a second chamber formed by a second side wall in plurality of side walls, the second chamber providing fluidic communication between the plurality of hot air ducts and the plurality of cold air ducts at a second end portion of each respective duct in the plurality of hot air ducts and the plurality of cold air ducts; and
   a heat exchange mechanism disposed in the second chamber, the heat exchange mechanism configured to remove heat from a first fluidic medium of the plurality of cold air ducts, the plurality of hot air ducts, the first chamber, and the second chamber, and wherein the heat exchange mechanism comprises:
   a controller,
   a pump coupled to the controller, the pump configured to control a flow of a second fluidic medium within the heat exchange mechanism, and
   a heat sink interfacing with the first fluidic medium and the second fluidic medium.

2. The heat collector device of claim 1, wherein the first chamber comprises an aperture providing fluidic communication between the environment and the heat collector.

3. The heat collector device of claim 1, the aperture is disposed at the first end portion of a first cold air duct in the plurality of cold air ducts in the first chamber.

4. The heat collector device of claim 1, the heat exchange mechanism is either disposed at the first end portion of a first cold air duct in the plurality of cold air ducts in the first chamber or at the second end portion of the first cold air duct in the second chamber.

5. The heat collector device of claim 1, wherein the heat exchange mechanism further comprises a sensor coupled to the controller, the sensor configured to determine an internal temperature gradient of the heat collector device.

6. The heat collector device of claim 1, wherein the heat sink is integrally formed with the exterior surface and the interior surface of the heat collector device.

7. The heat collector device of claim 1, wherein the exterior surface comprises a profiled surface.

8. The heat collector device of claim 7, wherein a vertical displacement of the profiled surface is in a range in between 0.5 centimeters and 5 centimeters.

9. The heat collector device of claim 1, wherein the exterior surface is electrically grounded to at least one side wall in the plurality of side walls.

10. The heat collector device of claim 1, wherein a length from the first side wall to the second side wall is in a range between 5 meters (m) and 20 m.

11. The heat collector device of claim 1, wherein the heat collector is a roof a building.

12. The heat collector device of claim 1, wherein the heat collector device is supported by a rafter of the building or a purlin of a building.

13. The heat collector device of claim 1, wherein the heat insulation comprises a first layer of heat insulation interfacing with the exterior surface and a second layer of heat insulation interfacing with the interior surface.

14. The heat collector device of claim 1, wherein the heat insulation comprises an inorganic material.

15. The heat collector device of claim 14, wherein the inorganic material comprises silicon oxides, aluminum oxides, hydroxides, or a combination thereof.

16. The heat collector device of claim 1, wherein the heat insulation comprises a fire retardant material.

17. The heat collector device of claim 1, wherein the plurality of side walls comprises a third side wall comprising a first mating mechanism and a fourth side wall comprising a second mating mechanism configured to couple with the first mating mechanism.

18. The heat collector device of claim 1, further comprising a spacer interposing between the exterior surface and each hot air duct in the plurality of hot air ducts.

19. The heat collector device of claim 1, wherein each side wall in the plurality of side walls comprises a profiled surface.

* * * * *